(12) United States Patent
Halyak (10) Patent No.: US 6,173,621 B1
(45) Date of Patent: Jan. 16, 2001

(54) COMPACT MULTISPEED TRANSMISSION

(76) Inventor: George Halyak, P.O. Box 2949, Carson City, NV (US) 89703

( * ) Notice: Under 35 U.S.C. 154(b), the term of this patent shall be extended for 0 days.

(21) Appl. No.: 09/455,727

(22) Filed: Dec. 6, 1999

(51) Int. Cl.[7] .................................................... F16H 3/08
(52) U.S. Cl. ................................................................ 74/333
(58) Field of Search ................................................ 74/333

(56) References Cited

U.S. PATENT DOCUMENTS

| | | |
|---|---|---|
| 971,883 | 10/1910 | Gant . |
| 1,064,365 | 6/1913 | Munsing . |
| 1,277,251 | 8/1918 | Ott . |
| 1,362,490 | 12/1920 | Keck . |
| 1,415,515 | 5/1922 | Bouillon . |
| 2,535,632 | * 12/1950 | Herr, Jr. ................................... 74/333 |

FOREIGN PATENT DOCUMENTS 63-312541 * 12/1988 (JP) ......................................... 74/333

* cited by examiner

*Primary Examiner*—Dirk Wright
(74) *Attorney, Agent, or Firm*—Siemens Patent Services, LC (57) ABSTRACT

A speed change gear transmission providing at least six speed ratios from eight gears, and nine speeds from nine gears. The transmission has an input shaft, an intermediate shaft, and an output shaft. At least three gears are associated with the input and intermediate shafts, and two gears with the output shaft. In the preferred embodiments, the number of gears associated with each shaft is equal, is at least three, and optionally may be four or more. The number of available speed ratios in embodiments having equal numbers of gears on each shaft is equal to the square of the number of gears on any one shaft. Gears of the intermediate shaft are solidly fixed to rotate in tandem. Gears of the input and output shafts are freely rotatable on bearings on their respective shafts, and are splined to engage dog clutches. The dog clutches are disposed in slidable, splined relation to their respective shafts to selectively couple one of the input shaft gears to the input shaft and one of the output shaft gears to the output shaft. Dog clutch operation may be by manual, solenoid, pneumatic, or hydraulic action. A lock out feature disabling one or more ratios is optional.

12 Claims, 8 Drawing Sheets

COMPACT MULTISPEED TRANSMISSION

BACKGROUND OF THE INVENTION

1. Field of the Invention

The present invention relates to meshing gear transmissions for transmitting and varying torque and speed from input torque and speed. More specifically, the invention sets forth a compact, constant mesh gear arrangement using uncomplicated shaft forms enabling many different ratios to be realized from a minimal number of gears and shafts. The invention finds utility in the automotive field, broadly defined. The invention is usable in powered motor vehicles wherein wheels, propellers, propulsion screws, and the like must be operated at speeds and torques varying from those of a power plant. Motor vehicles, including automobiles, trucks, and motorcycles are the principal but not sole applications. Of course, machine tools and machinery generally requiring gear reductions may utilize the present invention.

2. Description of the Prior Art

Motor vehicles relying on internal combustion engines having a rotating power output shaft have long had to match power and rotational speed of the engine to actual requirements. In most cases, the engines are high speed, and require reduction in shaft speed from the engine to the driven element, such as powered road wheels. Since power demand for different aspects of vehicle operation varies considerably with conditions, more than one reduction ratio is required. General purpose road going automobiles are currently available with four, five, or six forward speeds. Road going, freight hauling trucks may have sixteen speeds. The greater the number of available reduction ratios, the greater the versatility of the drive train with respect to fuel efficiency, engine life, acceleration, noise, and similar aspects of operation.

Conventional transmissions employ plural spur or helical cut gears. The gears ride on supporting shafts, and are keyed by splines or interface with dogs formed on splined engagement rings or gears to their shafts. The engagement rings are slid along the shaft, turning in lockstep therewith, and mesh with dogs formed on the face of each gear. Gears are provided in meshing pairs, each one of the pair supported on one shaft. The number of gears required to provide a predetermined number of reduction ratios usually exceeds the number of available ratios. Examples are seen in U.S. Pat. No. 971,883, issued to Kenneth W. Gant on Oct. 4, 1910, U.S. Pat. No. 1,064,365, issued to George D. Munsing on Jun. 10, 1913, U.S. Pat. No. 1,277,251, issued to Johann Klaus Ott on Aug. 27, 1918, U.S. Pat. No. 1,362,490, issued to Robert Keck on Dec. 14, 1920, and U.S. Pat. No. 1,415,515, issued to Constant Bouillon on May 9, 1922. In most of these examples, the subject transmission employs conventional elements such as three shafts, these being an input shaft, an output shaft, and a counter shaft, shift forks, and toothed gears which rotate on the three shafts.

None of the above inventions and patents, taken either singly or in combination, is seen to describe the instant invention as claimed.

SUMMARY OF THE INVENTION

The present invention provides a transmission of unparalleled simplicity, which employs three shafts, toothed gears, and engagement rings in a manner which enables at least as many reduction ratios to be available as the number of gears. Three parallel shafts are employed, two having external splines. Freely rotatable gears ride on the two shafts, carried on bearings enabling the gear to rotate independently of its shaft. Each gear has two corresponding gears meshed therewith, each disposed on one other shaft. Therefore, gears permanently meshed to one another occur in associated or meshed groups of three.

Driving relationship of any one gear to its associated shaft is controlled by engagement rings. Each engagement ring can couple either one of two axially surrounding gears of one supporting shaft to that shaft. When any one gear is locked to its shaft by an engagement ring, two other gears supported on the other two shafts are driven thereby as a consequence of the meshing arrangement. The gears are interconnectable such that a driven gear can in turn be drivingly connected directly to a gear permanently meshing therewith and indirectly to any other gear in the gear set. The result is that many final reduction ratios are possible from a gear set having a minimal number of gears.

With three shafts, the total number of reduction ratios for a nine gear transmission can be nine ratios or speeds. For a twelve gear, three shaft transmission, the number of ratios or speeds is sixteen. The number of ratios available from a three shaft transmission is equal to the square of the number of gears on each shaft, when the number of gears on each shaft is equal to the number of gears on each other shaft.

The minimal number of gears leads to several important benefits. One is that the transmission is quite compact for the number of ratios offered. Another is that the transmission is of correspondingly reduced cost for the number of ratios offered. The great number of ratios can be exploited in several ways. It may be desirable to employ all available ratios. Alternatively, it may be desirable to leave some ratios permanently unavailable in some applications or some ratios made temporarily unavailable or idle in other applications. Idling some ratios can be accomplished by a lock out feature which can optionally be overridden or reconfigured to lock out different ratios when adjusted accordingly. Accordingly, it is a principal object of the invention to provide a maximum number of gear reduction ratios for the number of gears employed in a multiple speed transmission.

It is another object of the invention to make transmissions more compact and economical.

It is a further object of the invention to provide sufficient number of gear ratios so that some gear ratios can be idled for a particular application and employed in other applications.

It is an object of the invention to make transmissions of uncomplicated construction, enabling uncomplicated assembly and adjustment.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
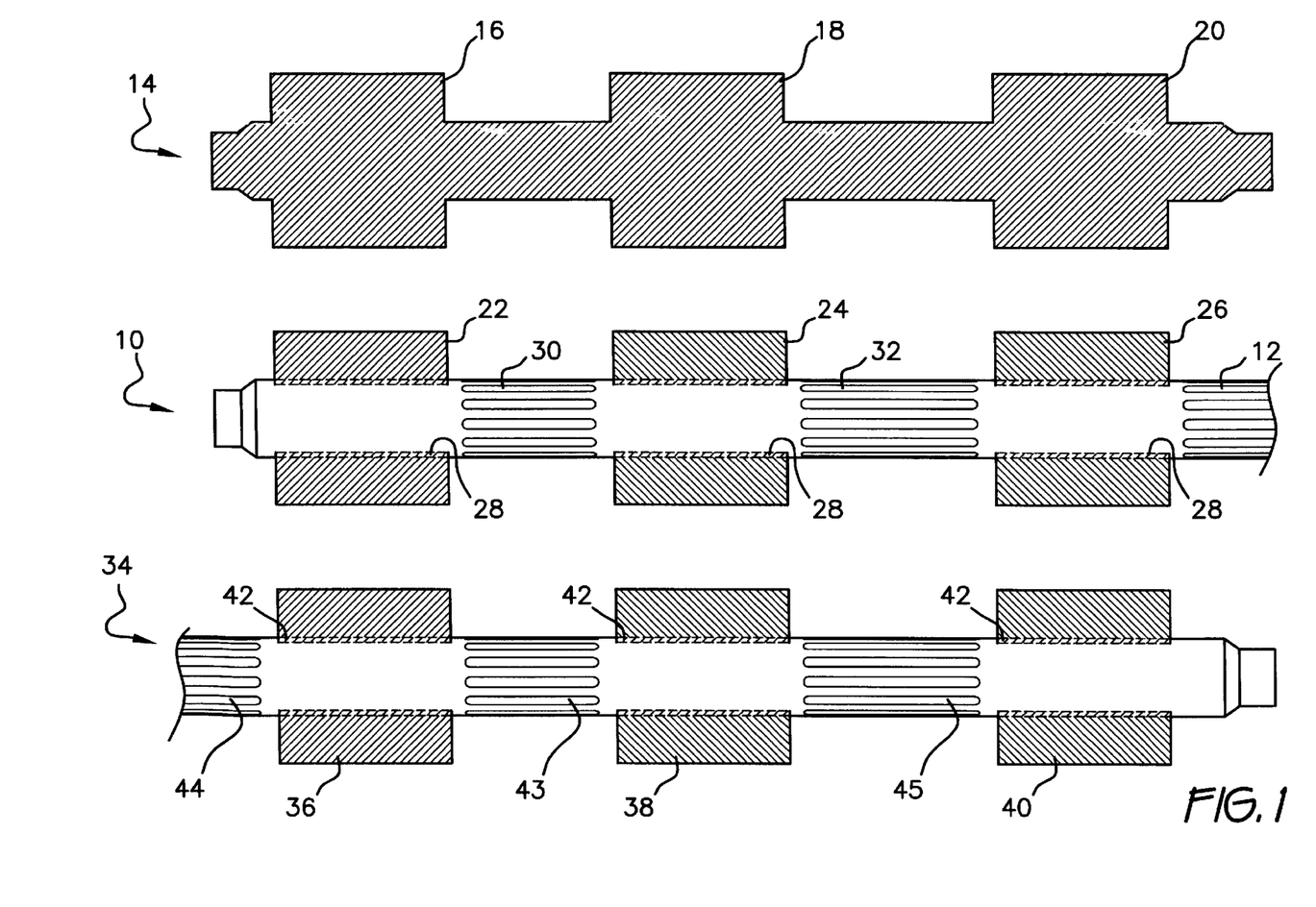
FIG. 1 is a diagrammatic, exploded detail view showing gears and their supporting shafts of one embodiment of the novel transmission.

FIG. 1 of the drawings shows operative relationship of the gears and their shafts. Specifically, shaft 10 is an input shaft having splines 12 for connecting to rotational speed and torque inputs from a power source such as an internal combustion engine (not shown). Shaft 14 is an intermediate shaft having gears 16, 18, 20 solidly fixed thereto. Gears 22, 24, 26 are rotatably borne on bearings 28 on shaft 10. Gears 22, 24, 26 are clutched to shaft 10 by engagement rings (see FIG. 5) which are slidably mounted on external shaft splines 30, 32. Output shaft 34 is generally similar to input shaft 10, having gears 36, 38, 40 rotatably borne on bearings 42. Output splines 44 enable a drive line component such as a drive shaft (not shown) to be drivably connected to output shaft 34. Preferably, shafts 10, 14, 34 are parallel as this simplifies machining and gear design, although the invention could be practiced employing shafts that are not parallel.

It is important to bear in mind that the exploded depiction of FIG. 1 conceals that gears 16, 22, and 36 are always meshed, and rotate together accordingly. Similarly, gears 18, 24, and 38 are always meshed, and gears 20, 26, and 40 are always meshed. Also, gears 22, 24, 26 can rotate independently of rotation of shaft 10, and gears 36, 38, 40 can rotate independently of shaft 34.

Figure 2:
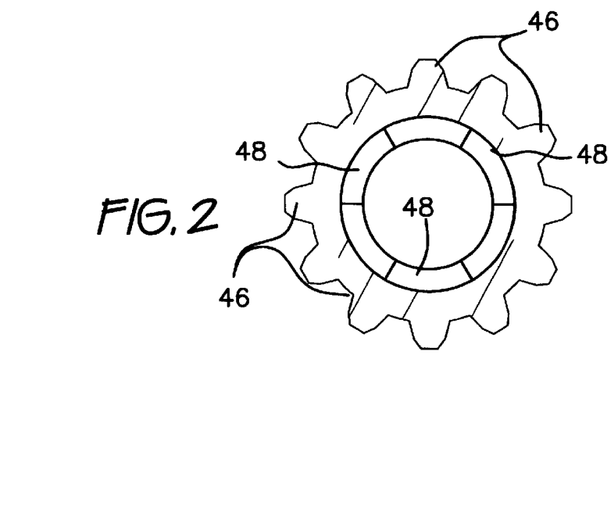
FIG. 2 is an end elevational detail view of a typical gear.

FIG. 2 shows a gear which is representative of gears 22, 24, 26, 36, 38, and 40. The representative gear has external teeth 46. The number of teeth 46 on each gear varies from the example depicted in FIG. 2 to achieve different ratios as the gears are selectively coupled to shafts 10 and 34. Despite depiction of the various gears herein as being of similar diameters, actual diameters of the gears may vary.

Figure 3:
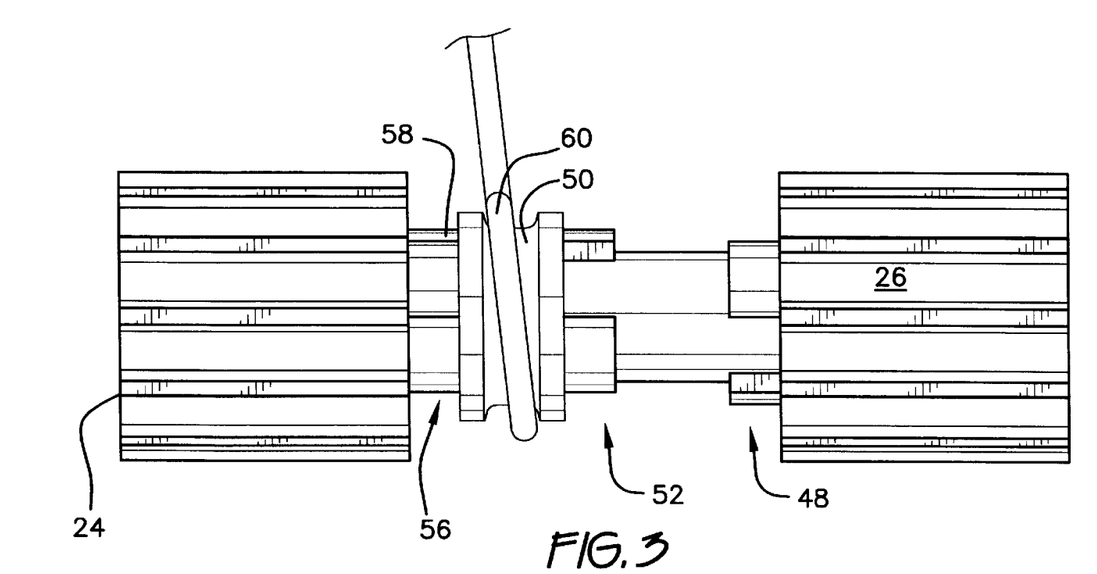
FIG. 3 is a diagrammatic, side elevational detail view of two adjacent gears and an engagement ring which selectively couples one of the two gears to their associated support shaft.

FIG. 3 shows how engagement ring 50 cooperates with gears 24 and 26. Engagement ring 50 has a dog 52, shown projecting to the right, and a dog 56, shown projecting to the left. Dogs 52 and 56 are matingly compatible with dog 48 of the gears. Engagement ring 50 is moved left and right into and out of engagement with gear 24 by a shift fork 60. In the case of gears 24 and 26, engagement ring 50 is movable among three positions. In the position depicted, engagement ring 50 engages gear 24, coupling it to input shaft 10. In another position, engagement ring 50 engages gear 26, releasing engagement with gear 24. In a neutral position between the first two positions, engagement ring 50 is released from engaging either gear 24 or 26. Unlike the various gears of shafts 10 and 34, the engagement rings rotate in lockstep with their associated shafts 10 or 34. Internal splines 48 key the engagement rings to splines 30, 32, 43, 45 (see FIG. 1) of respective shafts 10, 34.

Figure 4:
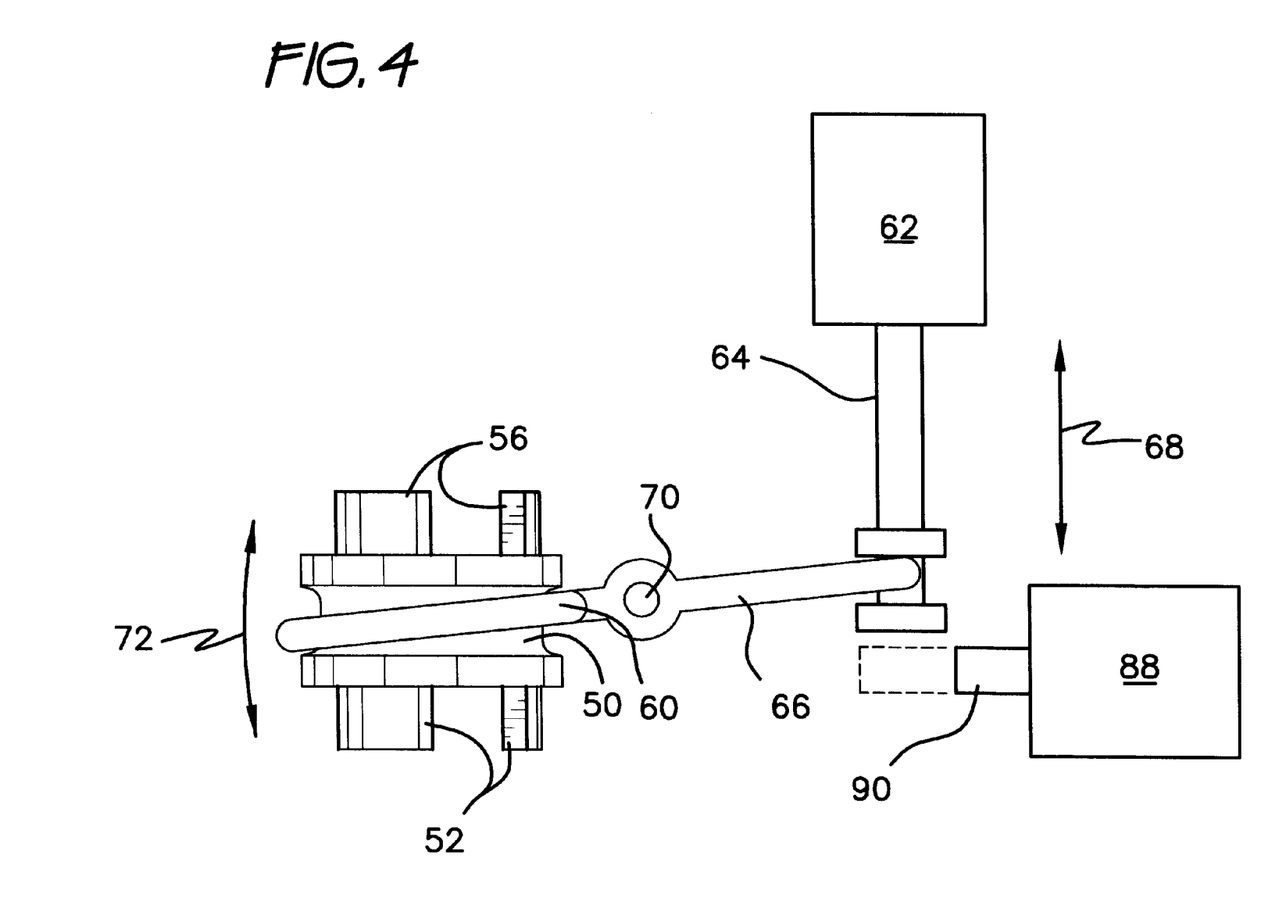
FIG. 4 is a diagrammatic, top plan detail view of FIG. 3, additionally showing a shift fork which moves the engagement ring and also showing components which operate the shift fork.

FIG. 4 illustrates movement of shift fork 60 in one embodiment of a shift mechanism. A manual linkage including a hand lever is shown representatively at 62. An arm 64 of linkage 62 moves against arm 66 of shift fork 60 in directions indicated by arrow 68. Shift fork 60 rotates responsively about an axis 70, moving in the direction indicated by arrow 72.

Figure 5:
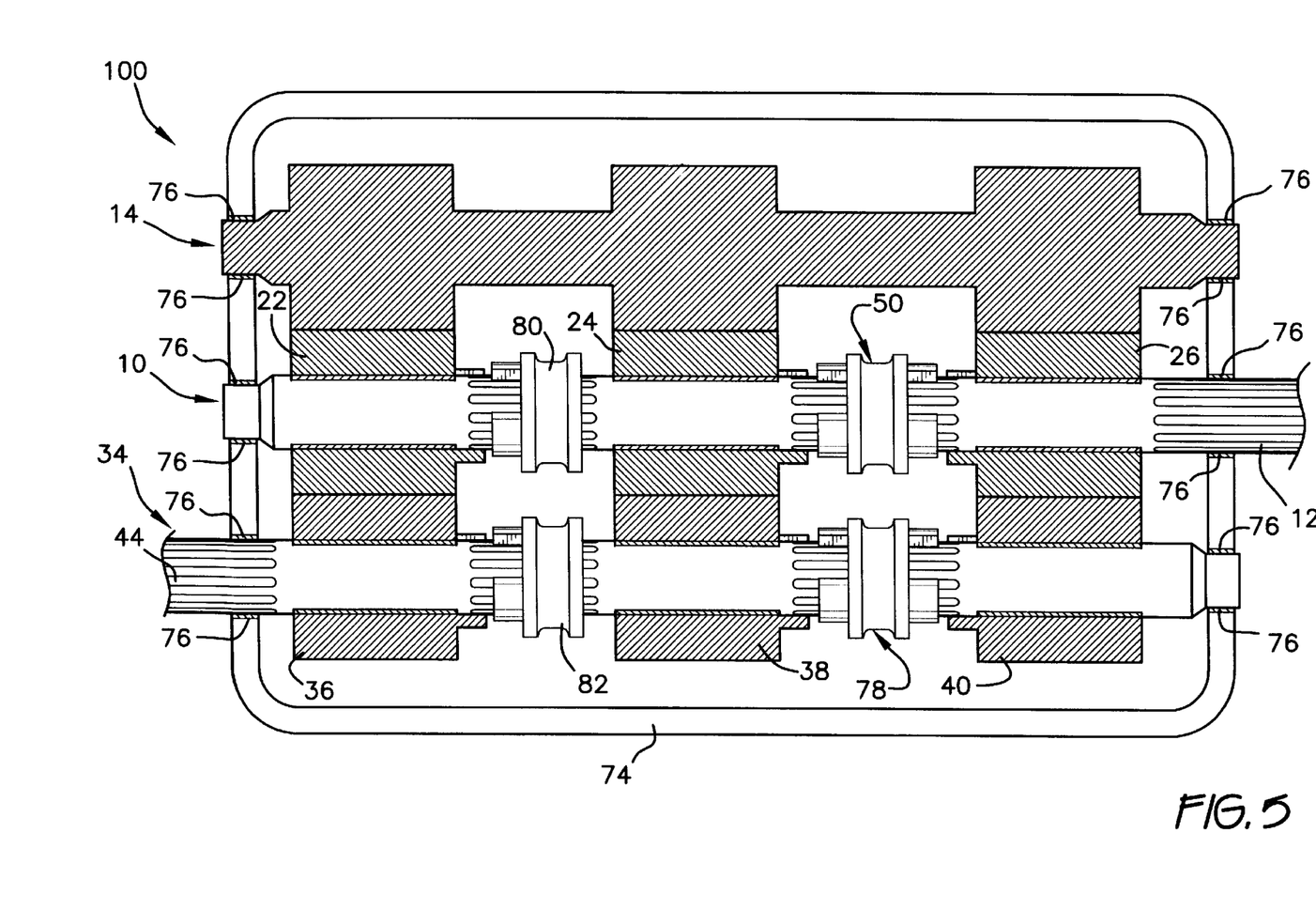
FIG. 5 is a diagrammatic, side elevational view of the assembled transmission, and is shown partially in cross section.

Speed change gear transmission 100 is shown in assembled condition in FIG. 5. Transmission 100 serves the function of modifying and transmitting rotational speed and torque inputs from the power source to any selected one of a plurality of rotary speeds and torques available from the many gear ratios. Transmission 100 includes a housing 74 which supports shafts 10, 14, and 34 in parallel orientation such that each shaft 10, 14, or 34 is at least partially contained within housing 74. It is contemplated that shaft ends shown exposed in FIG. 5 will in practice be fully enclosed for better support and to exclude external contaminants from shaft bearings 76 and from the interior of housing 74. Input and output shafts 10, 34 are partially exposed so that their input and output splines 12, 44 are accessible for ready connection.

Engagement ring 50 is slidably borne on splines 32 by internal splines (not visible in FIG. 5) formed therein. Engagement rings 78, 80, 82 are also provided. Engagement ring 78 is identical to engagement ring 50, and serves gears 38 and 40. Identical engagement rings 80, 82 have dogs on one side only since in the embodiment of FIG. 5, each engagement ring 80 or 82 serves only one gear 22 or 36 (respectively). Shift fork 60 and corresponding shift forks for serving the remaining engagement rings are omitted from FIG. 5 for clarity of the view.

FIG. 5 shows that engagement ring 50 is located on shaft 10 between and is selectively drivably engageable with gears 24, 26. Engagement ring 80 is located on shaft 10 between gears 22, 24, and is selectively drivably engageable with gear 22. Engagement ring 78 is located on shaft 34 between and is selectively drivably engageable with gears 38, 40. Engagement ring 82 is located on shaft 34 between gears 36, 38, and is selectively drivably engageable only with gear 36. The various engagement rings may be synchronized to mesh smoothly with their associated gears, if desired.

Figure 6:
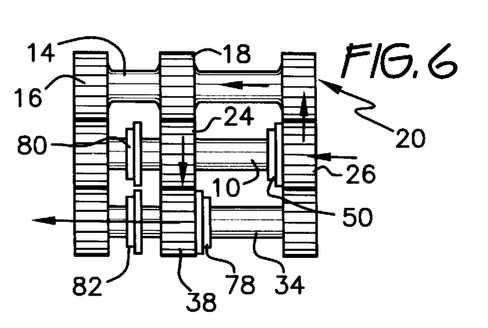
FIGS. 6–14 diagrammatically illustrate power flow paths utilizing selected engagement of the gears of FIG. 1.
Figure 7:
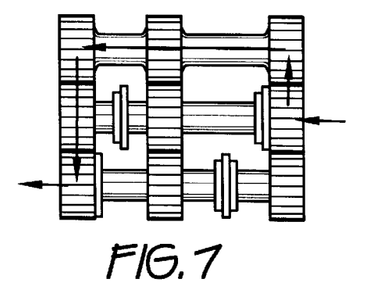
Figure 8:
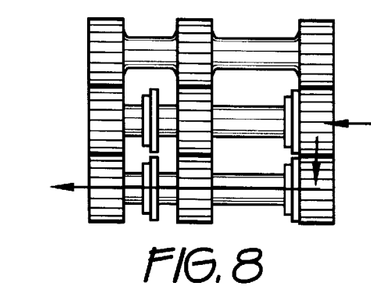
Figure 9:
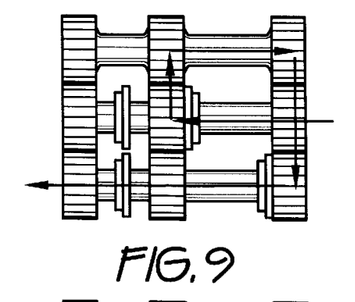
Figure 10:
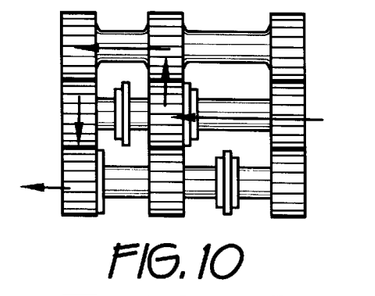
Figure 11:
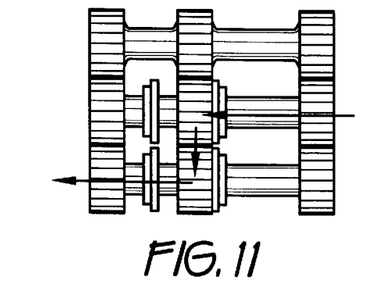
Figure 12:
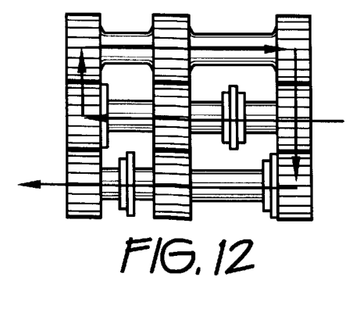
Figure 13:
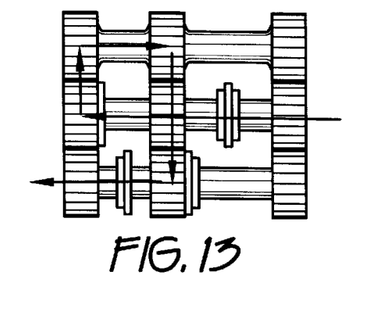
Figure 14:
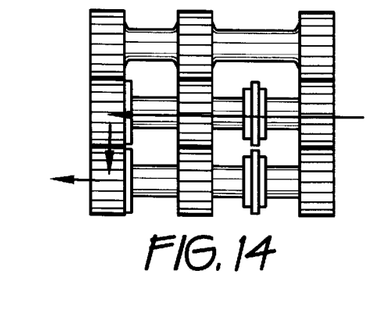

The arrangement of engagement ring engagement leads to nine available gear ratios in the embodiment of FIG. 5. These are shown in FIGS. 6–14. In FIG. 6, engagement ring 50 locks gear 26 to input shaft 10 (see FIG. 5). Gear 26 drives gear 20, which gear 20 is fixed to intermediate shaft 14. Gear 18, also fixed to intermediate shaft 14, drives gear 24, which drives gear 38. Engagement ring 78 locks gear 38 to output shaft 34 (see FIG. 5). Transfer of torque from input shaft 10 to output shaft 34 may be followed by consulting arrows shown in FIG. 6. Engagement rings 78, 80 are in neutral positions, wherein they do not engage any gear.

Figure 15:
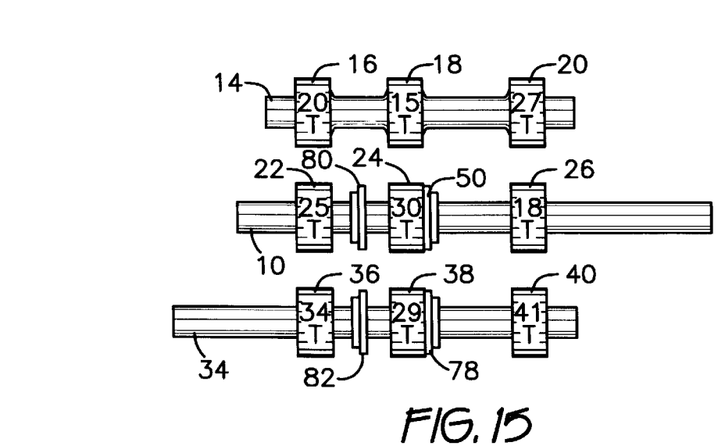
FIG. 15 is a diagrammatic, partially exploded side elevational view of FIG. 1, and shows an example of gear ratios.

Engagement rings 50, 78, 80, 82 are controlled by linkage 62 (see FIG. 4) such that one gear on shaft 10 is locked or keyed to shaft 10, and one gear on shaft 34 is locked or keyed to shaft 34. FIGS. 7–14 show the various combinations of engagement of the engagement rings that are possible. Arrows in each Figure show the resultant flow path of torque. It will be understood that FIGS. 7–14 correspond to and illustrate the same components shown in FIG. 6, and that reference numerals are deleted for clarity. FIGS. 6–14 illustrate the nine gear ratios available from the nine gear embodiment shown in FIG. 5. It will be remembered that although the various gears are depicted as being of equal diameter, this is not the case. Rather, the overall diameter of each gear relates to the number of teeth provided on each gear. FIG. 15 shows a representative number of teeth which may be provided on the various gears, the number for each gear being inscribed directly on the respective gear, Returning to FIG. 4, there is shown an optional lock out element which selectively prevents engagement of a selected ratio. This option is employed when the total number of active ratios is to be temporarily limited to fewer than the total number of available ratios. When a solenoid 88 is energized, a plunger 90 projects therefrom. Plunger 90 interferes with arm 64 of linkage 62, so that the engagement ring (in this example, engagement ring 50) being controlled cannot cause its associated shift fork 60 to move into engagement with a selected gear. Any or all of the gears can be inhibited in this manner, so that the number of active gear ratios is reduced from the number of gear ratios which are theoretically available. The lock out element can take other forms. For example, a mechanical linkage (not shown) could be configured to selectively avoid moving a shift fork to one of its normally available positions, or to avoid entirely operating the selected shift fork.

Figure 16:
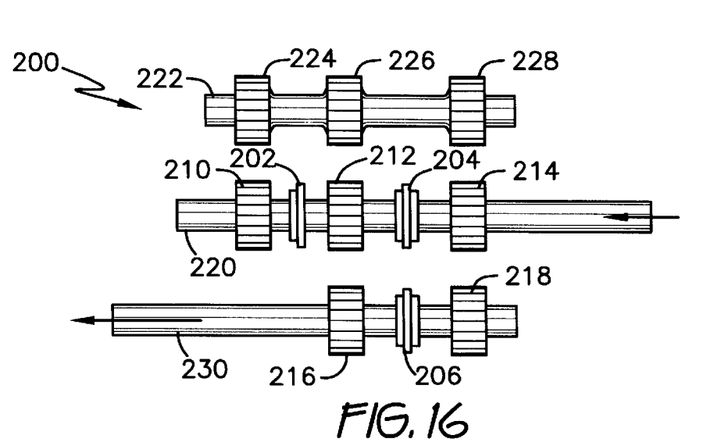
FIG. 16 is a diagrammatic view of a second embodiment of the invention wherein eight gears and six gear ratios are provided.
Figure 17:
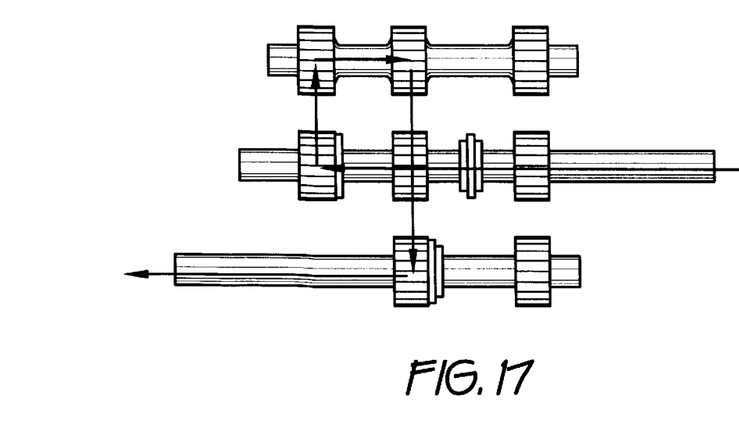
FIGS. 17–22 show power flow paths possible for the embodiment of FIG. 16.
Figure 18:
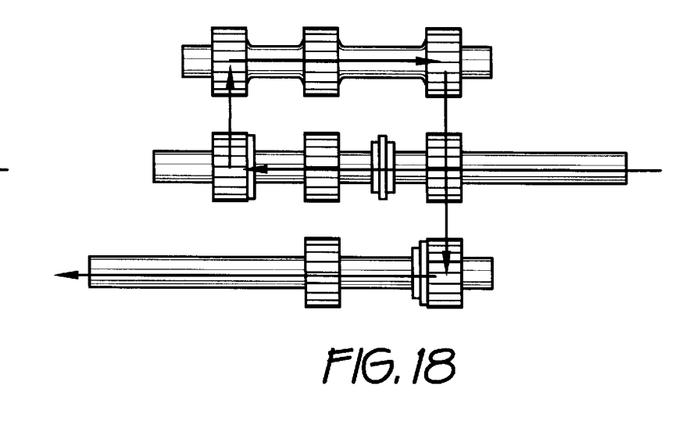
Figure 19:
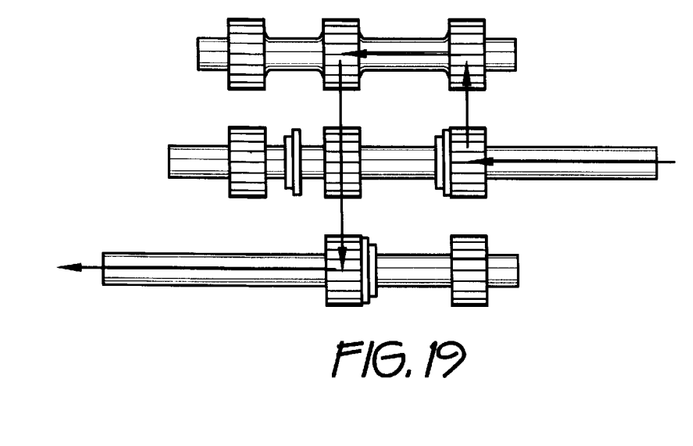
Figure 20:
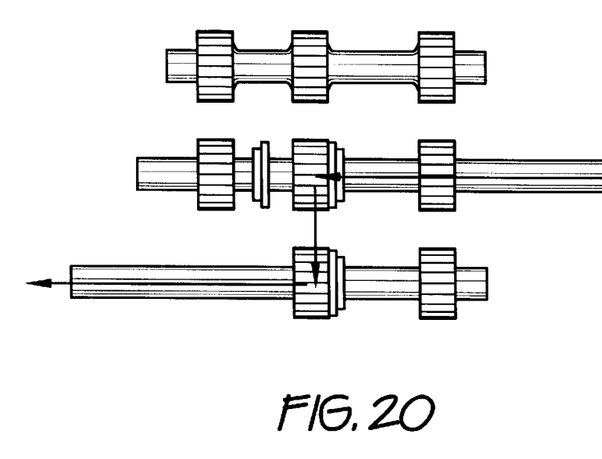
Figure 21:
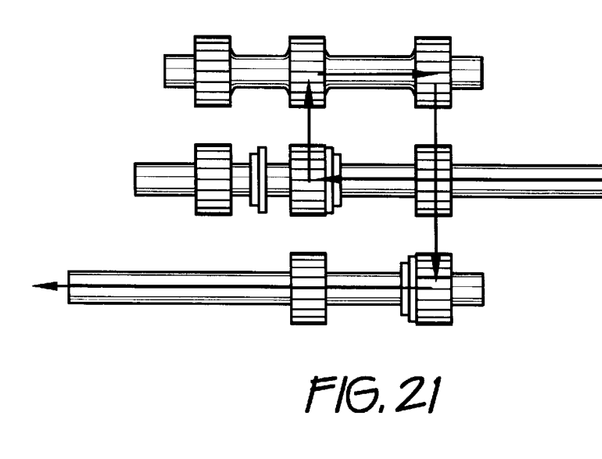
Figure 22:
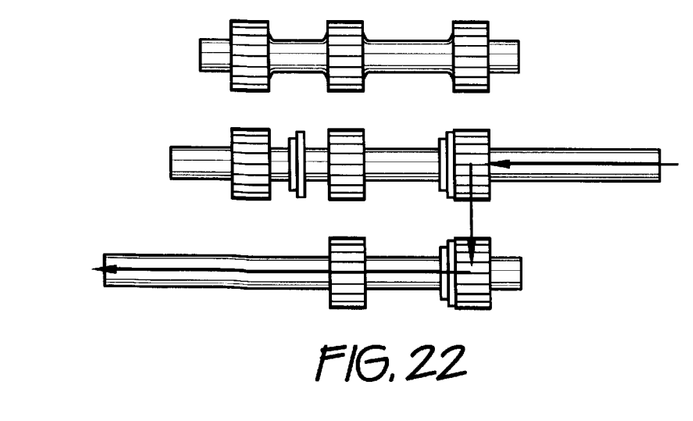

FIG. 16 shows an embodiment of the invention wherein one gear and one engagement ring have been eliminated from the embodiment of FIG. 1. The resultant transmission 200 will offer six speeds or ratios. Engage ment of engagement ring 202, 204, or 206 with an associated gear 210, 212, 214, 216, or 218 is indicated by abutment of the engagement ring with the gear. Transmission 200 includes an input shaft 220, an intermediate shaft 222 having three gears 224, 226, 228, and an output shaft 230. It will be understood that these components operate in manners essentially similar to those of the embodiment of FIG. 5, with the exception of the eliminated components. FIGS. 17–22 show the power flow paths which ensue from the arrangement of FIG. 16 with appropriate engagement of engagement rings and gears.

Figure 23:
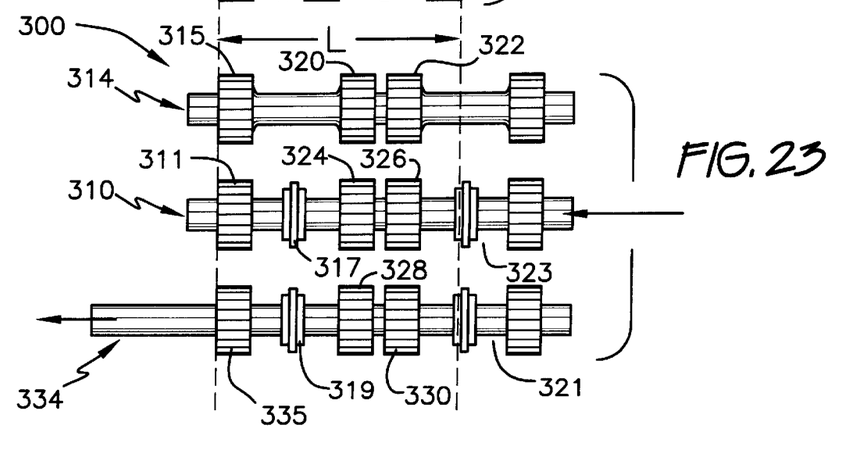
FIG. 23 is a diagrammatic view of a third embodiment of the invention wherein twelve gears and sixteen gear ratios are provided.

FIG. 23 shows a modification of the embodiment of FIG. 1 to provide sixteen speed ratios. In the embodiment of FIG. 23, transmission 300 includes three shafts 310, 314, 334, each shaft 310, 314, or 334 having one more gear 311, 315, or 335, respectively, than does the embodiment of FIG. 1, for a total of four gears on each shaft. The engagement rings are modified to have dogs on both faces. Transmission 300 achieves sixteen ratios with the same number of engagement rings as the embodiment of FIG. 5, with one difference being that engagement rings 317, 319, 321, 323 are eac h movable among three positions. This results in a highly compact transmission housing for the number of ratios achieved, in part since gears 320, 322 can be located close to one another, as can gears 324, 326, and gears 328, 330. Transmission 300 will be understood to include a housing (not shown) and appropriate linkage (not shown) for operating the various engagement rings, although these components have been omitted from the view for clarity.

The various possible engagements of all engagement rings of the embodiment of FIG. 23 will result in sixteen speed ratios available from the twelve total gears and the four or six engagement rings. A transmission (not shown) having fifteen gears (five gears on each of three shafts) would offer up to twenty-five speed ratios. In the fifteen gear transmission, additional engagement rings would be furnished where required. Selective engagement of one gear on the input shaft and one gear on the output shaft would be accomplished by engagement rings as appropriate, employing the principle of operation of the embodiment of FIG. 1.

Figures 24, 25:
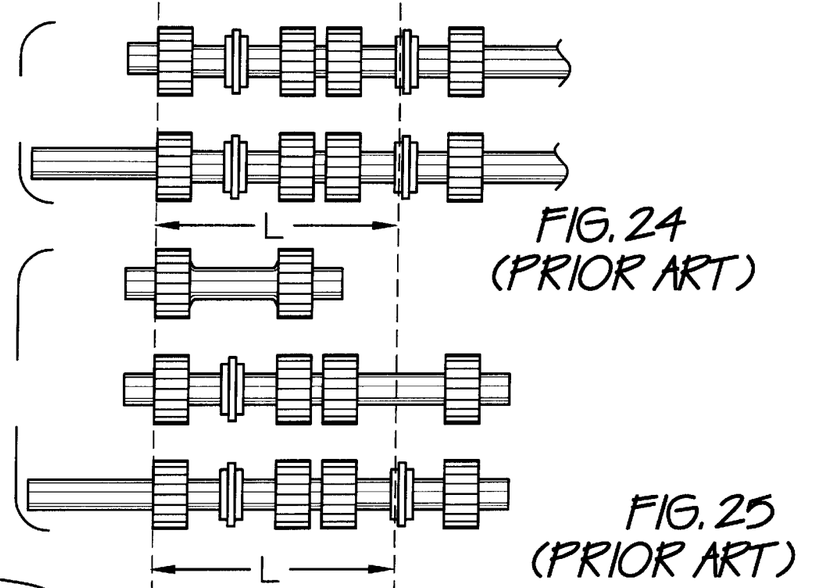
FIGS. 24 and 25 are diagrammatic views of prior art transmissions.

Compactness of the invention is illustrated by comparing FIGS. 23, 24, 25, and 26. FIGS. 24 and 25 represent prior art transmissions wherein, respectively, nine speeds are provided by eighteen gears, and seven speeds are provided by ten gears. In FIG. 25, although the drawing has been simplified, the actual transmission has concentric shafts and other complicating structure such that the number of ratios feasibly achieved is limited to eight. The considerable complication present in the prior art transmission is not necessary with the present invention to achieve a compact design.

Figure 26:
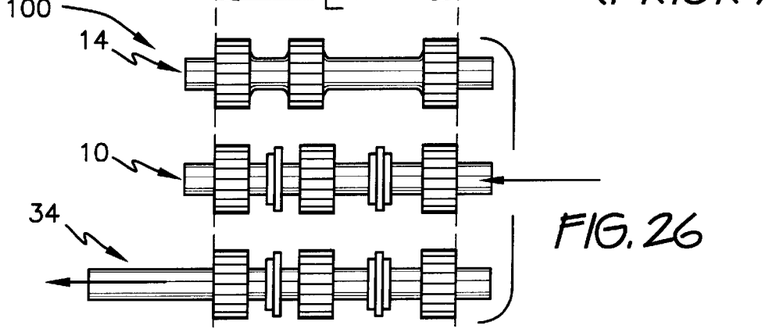
FIG. 26 is similar to FIG. 1, but is reduced in scale to permit visual comparison with FIGS. 24 and 25.

By contrast with the prior art designs, transmission 100, shown in scale in FIG. 26 comparable to those of FIGS. 24 and 25, has a length dimension L which is considerably shorter than is the overall length of the prior art transmissions of FIGS. 24 and 25. Despite this minimal length, transmission 100 provides a number of speed ratios equal to that of the prior art transmission of FIG. 24, and two more speeds than the slightly longer prior art transmission of FIG. 25. With only slight increase in length over transmission 100 of FIG. 26, transmission 300 of FIG. 23 provides sixteen speed ratios.

The number of available ratios may be increased beyond the embodiments illustrated herein. Given that the number of ratios available from the novel arrangement is equal to the square of the number of gears on any one shaft, provided that an equal number of gears is provided on all shafts, increasing the number of gears on each shaft will increase the number of total gear ratios provided.

The present invention is susceptible to variations and modifications which may be introduced without departing from the inventive concept. Illustratively, actuation of shift forks and lock out elements may be indirect or even fully automated. These components may be actuated by solenoid, pneumatic, or hydraulic power. In another example, output shafts (such as output shaft 34 of FIG. 5) could exit housing 74 on the same side as that from which input shaft 10 exits the housing. Locking of gears to their respective shafts may be accomplished in a variety of ways. Any embodiment of the invention can be coupled with a doubling or splitter transmission to provide wide ratio spreads.

In another example, the transmission of the embodiment of FIG. 16 could achieve the number of ratios by eliminating a different gear instead of that shown and described. For example, the gear eliminated could be from a different shaft.

In still another example, the gears could be replaced by sprockets and associated chains or belts.

It is to be understood that the present invention is not limited to the embodiments described above, but encompasses any and all embodiments within the scope of the following claims.

I claim:

1. A speed change gear transmission for modifying and transmitting a rotation input from a rotary power source to any selected one of a plurality of rotation outputs, comprising:

a housing;

an input shaft disposed to receive the rotation input, an intermediate shaft, and an output shaft disposed to transmit a rotation output, wherein said input shaft, said intermediate shaft, and said output shaft are each supported in fixed position to one another by said housing;

at least three gears independently rotatably supported on said input shaft, at least three gears supported on said intermediate shaft, and at least three gears independently rotatably supported on said output shaft; and clutching apparatus disposed to drivably interconnect said gears such that at least nine gear ratios ensue between the rate of rotation of said input shaft and said output shaft.

2. The speed change gear transmission according to claim 1, wherein said input shaft, said intermediate shaft, and said output shaft are parallel to one another.

3. The speed change gear transmission according to claim 1, further comprising means for operating said clutching apparatus to selectively drivably interconnect said gears.

4. The speed change gear transmission according to claim 1, further including a lock out element disposed to selectively prevent engagement of a selected one of said gears.

5. The speed change gear transmission according to claim 1, wherein said clutching apparatus includes a plurality of engagement rings each slidably mounted on and keyed to one of said input shaft and said output shaft, wherein each said engagement ring has end dogs disposed to be able to mesh with at least one of said gears.

6. The speed change gear transmission according to claim 5, further including a plurality of shift mechanisms disposed to slide said engagement rings along their respective said shafts into and out of engagement with said gears.

7. The speed change gear transmission according to claim 1, further including a lock out element disposed to prevent said clutching apparatus from engaging a selected said gear.

8. The speed change gear transmission according to claim 1, wherein the number of said gears is twelve, wherein four said gears are disposed on said input shaft, four other said gears are disposed on said intermediate shaft, and four remaining gears are disposed on said output shaft, and sixteen speed ratios ensue between the rate of rotation of said input shaft and said output shaft.

9. A speed change gear transmission for modifying and transmitting rotational speed and torque inputs from a rotary power source to any selected one of a plurality of rotary speeds and torques, comprising:

a housing;

an input shaft rotatably supported by and at least partially contained within said housing, bearing external splines;

an intermediate shaft rotatably supported by and at least partially contained within said housing;

an output shaft rotatably supported by and at least partially contained within said housing, bearing external splines;

a first gear having external teeth, a second gear having external teeth, and a third gear having external teeth, wherein said first gear, said second gear, and said third gear are spaced apart from one another and rotatably borne upon said input shaft;

a fourth gear having external teeth, a fifth gear having external teeth, and a sixth gear having external teeth, wherein said fourth gear, said fifth gear, and said sixth gear are spaced apart from one another and borne upon said intermediate shaft, wherein said fourth gear is disposed in constantly driving relationship to said first gear, said fifth gear is disposed in constantly driving relationship to said second gear, and said sixth gear is disposed in constantly driving relationship to said third gear;

a seventh gear having external teeth and an eighth gear having external teeth and internal splines, wherein said seventh gear and said eighth gear are spaced apart from one another and rotatably borne upon said output shaft, wherein said seventh gear is disposed in constantly driving relationship to said first gear and said fourth gear, and said eighth gear is disposed in constantly driving relationship to said second gear and said fifth gear;

a first clutch axially movably disposed on said input shaft and located between said first gear and said second gear, said first clutch having internal splines compatible with said external splines of said input shaft, first end splines compatible with said splines of said first gear and second end splines compatible with said splines of said second gear, wherein said first clutch is selectively drivably engageable with said first gear and said second gear by splined connection therewith;

a second clutch axially movably disposed on said input shaft and located between said second gear and said third gear, said second clutch having internal splines compatible with said external splines of said input shaft and end splines compatible with said splines of said third gear, wherein said second clutch is selectively drivably engageable with said third gear by splined connection therewith;

a third clutch axially movably disposed on said output shaft and located between said seventh gear and said eighth gear, said third clutch having internal splines compatible with said external splines of said output shaft and end splines compatible with said splines of said seventh gear and of said eighth gear, wherein said third clutch is selectively drivably engageable with said seventh gear and said eighth gear by splined connection therewith.

10. The speed change gear transmission according to claim 9, wherein said input shaft, said intermediate shaft, and said output shaft are parallel to one another.

11. The speed change gear transmission according to claim 9, further comprising means for selectively moving said first clutch into driving engagement with said first gear and said second gear, said second clutch into driving engagement with said third gear, and said third clutch into driving engagement with said seventh gear and said eighth gear.

12. The speed change gear transmission according to claim 9, further including a lock out element disposed to selectively prevent engagement of a selected one of said first gear, said second gear, said third gear, said fourth gear, said fifth gear, said sixth gear, said seventh gear, and said eighth gear.

* * * * *